(12) United States Patent
Muratani

(10) Patent No.: US 6,983,059 B2
(45) Date of Patent: Jan. 3, 2006

(54) DIGITAL WATERMARK DETECTING DEVICE AND METHOD THEREOF

(75) Inventor: Hirofumi Muratani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 587 days.

(21) Appl. No.: 10/007,769

(22) Filed: Dec. 7, 2001

(65) Prior Publication Data

US 2002/0116618 A1 Aug. 22, 2002

(30) Foreign Application Priority Data

Dec. 11, 2000 (JP) ............................. 2000-376323

(51) Int. Cl.
*G06K 9/00* (2006.01)
(52) U.S. Cl. .................................... 382/100
(58) Field of Classification Search ................ 382/100, 382/278, 232, 250
See application file for complete search history.

(56) References Cited

U.S. PATENT DOCUMENTS

| 5,809,139 | A | * | 9/1998 | Girod et al. ................ 380/202 |
| 5,825,892 | A | * | 10/1998 | Braudaway et al. ........... 380/51 |
| 5,915,027 | A | * | 6/1999 | Cox et al. ..................... 380/54 |
| 6,154,571 | A | * | 11/2000 | Cox et al. .................... 382/250 |
| 6,215,421 | B1 | * | 4/2001 | Kondo et al. ................. 341/50 |
| 6,404,926 | B1 | * | 6/2002 | Miyahara et al. ........... 382/232 |
| 6,477,431 | B1 | * | 11/2002 | Kalker et al. ................. 700/39 |
| 6,639,997 | B1 | * | 10/2003 | Katsura et al. ............. 382/100 |
| 6,678,390 | B1 | * | 1/2004 | Honsinger .................. 382/100 |

FOREIGN PATENT DOCUMENTS

| JP | 11-164134 | 6/1999 |
| JP | 2000-138818 | 5/2000 |
| JP | 2000-236432 | 8/2000 |

OTHER PUBLICATIONS

U.S. Appl. No. 09/450,337, filed Nov. 29, 1999, Unknown.
U.S. Appl. No. 09/533,767, filed Mar. 23, 2000, Unknown.

* cited by examiner

*Primary Examiner*—Jose L. Couso
*Assistant Examiner*—Tom Y. Lu
(74) *Attorney, Agent, or Firm*—Oblon, Spivak, McClelland, Maier & Neustadt, P.C.

(57) ABSTRACT

A digital watermark detecting device comprises a sequence generator which generates a predetermined sequence of numbers corresponding to a watermark which is to be detected, a shift circuit which shifts the digital content in unit of a predetermined part of data in predetermined directions, and obtain a predetermined number of shifted contents, a correlation calculator which divides the digital content and the shifted contents into blocks, arranges predetermined data obtained from the blocks of the contents to form sequences of numbers for each of the digital content and the shifted contents, and calculates correlations between the predetermined sequence of numbers and the sequences of numbers, and a determination unit which determines whether the predetermined sequence of numbers exists in the digital content based on the correlations.

19 Claims, 11 Drawing Sheets

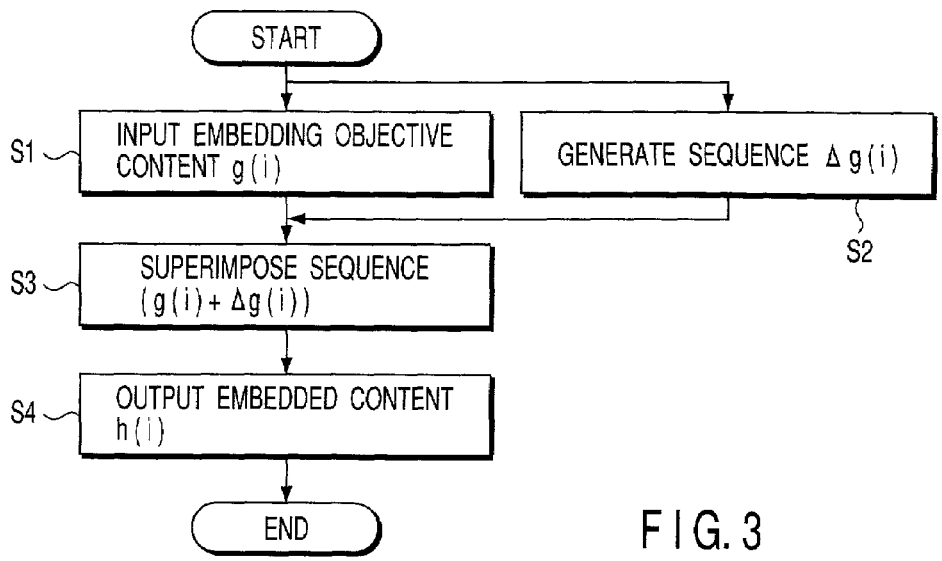
FIG. 3
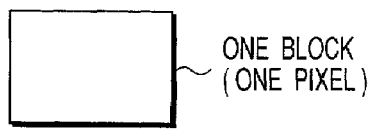
FIG. 4
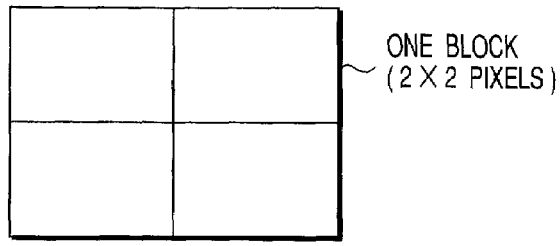
FIG. 5A
FIG. 5B

| g(1) | g(2) | g(3) | g(4) |
|------|------|------|------|
| g(5) | g(6) | g(7) | g(8) |
| g(9) | g(10) | g(11) | g(12) |
| g(13) | g(14) | g(15) | g(16) |

| g(1)+<br>Δg(1) | g(2)+<br>Δg(2) | g(3)+<br>Δg(3) | g(4)+<br>Δg(4) |
|---|---|---|---|
| g(5)+<br>Δg(5) | g(6)+<br>Δg(6) | g(7)+<br>Δg(7) | g(8)+<br>Δg(8) |
| g(9)+<br>Δg(9) | g(10)+<br>Δg(10) | g(11)+<br>Δg(11) | g(12)+<br>Δg(12) |
| g(13)+<br>Δg(13) | g(14)+<br>Δg(14) | g(15)+<br>Δg(15) | g(16)+<br>Δg(16) |

FIG. 13

| g'(1) | g'(2) | g'(3) | g'(4) |
|---|---|---|---|
| g'(5) | g'(6) | g'(7) | g'(8) |
| g'(9) | g'(10) | g'(11) | g'(12) |
| g'(13) | g'(14) | g'(15) | g'(16) |

FIG. 14

| g'(5) | g'(6) | g'(7) | g'(8) |
|---|---|---|---|
| g'(9) | g'(10) | g'(11) | g'(12) |
| g'(13) | g'(14) | g'(15) | g'(16) |
| g'(1) | g'(2) | g'(3) | g'(4) |

| g'(2) | g'(8) | g'(4) | g'(1) |
|---|---|---|---|
| g'(6) | g'(7) | g'(8) | g'(5) |
| g'(10) | g'(11) | g'(12) | g'(9) |
| g'(14) | g'(15) | g'(16) | g'(13) |

$(\mu, \nu) = (1, 0)$

| g'(16) | g'(13) | g'(14) | g'(15) |
|---|---|---|---|
| g'(4) | g'(1) | g'(2) | g'(3) |
| g'(8) | g'(5) | g'(6) | g'(7) |
| g'(12) | g'(9) | g'(10) | g'(11) |

| g'(6) | g'(7) | g'(8) | g'(5) |
|---|---|---|---|
| g'(10) | g'(11) | g'(12) | g'(9) |
| g'(14) | g'(15) | g'(16) | g'(13) |
| g'(2) | g'(3) | g'(4) | g'(1) |

FIG. 17

$(\mu, \nu) = (1, 1)$

DIGITAL WATERMARK DETECTING DEVICE AND METHOD THEREOF

CROSS-REFERENCE TO RELATED APPLICATIONS

This application is based upon and claims the benefit of priority from the prior Japanese Patent Application No. 2000-376323, filed Dec. 11, 2000, the entire contents of which are incorporated herein by reference.

BACKGROUND OF THE INVENTION

1. Field of the Invention

The present invention relates to a digital watermark detecting device which detects from a digital content a digital watermark embedded therein and a method for detecting a digital watermark.

2. Description of the Related Art

Digital watermarking is the technique wherein to a digital content such as digitalized still image data, motion picture image data, audio data, music data and the like (digital copyright data), identification information including copyright owner of the contents and users, copyright information of copyright owner, utilization conditions of the contents, secrecy information at the usage thereof, copy control information and the like (hereinafter collectively referred to as a digital watermark) is embedded so that such watermark is not be easily perceived. Thereafter, a watermark is detected from the content at necessity, thereby copyright protection including usage control and copy control is conducted and secondary utilization of information is promoted.

For the purpose of prevention against illegal use, the digital watermarking technique must have such characteristics that a watermark should not be lost or modified by various operations and intentional attacks that may be normally made on the content (hereinafter referred to as robustness). In order to realize robustness against various operations and attacks, a digital watermark should be embedded with a certain strength of robustness so that the digital watermark can be detected even after the content is infected by such illegal operations or attacks.

As one of the methods for embedding and detecting a digital watermark, a method using a sequence of numbers. In the case of this method, in embedding digital watermark, a sequence of numbers "a" corresponding to a digital watermark to be embedded is generated, and the sequence "a" is superimposed on a content. In detecting the digital watermark, an objective content where the digital watermark has been embedded, and an original content before embedding the digital watermark are compared with each other, thereby a sequence of numbers "b" that corresponds to the sequence of numbers that may have been superimposed on the objective content is obtained, and thereafter correlation values between the obtained sequence of numbers "b" and sequences of numbers that may be embedded "w1" to "wn" are obtained. When the correlation value is a threshold or more, it is determined that the sequence of numbers "wi (i=1 to n)" is embedded in the objective content.

However, the method that requires an original content for detecting the digital watermark as mentioned above has a problem that the application range thereof is limited. For example, in a watermark detector which is located at a user side for the purpose of use control and copy control of a content, from its nature, it is impossible to use an original content. Provision of an original content without a digital watermark to the user side for use control and copy control makes embedding digital watermarking meaningless. Accordingly, for some of applications of digital watermarking, a method for specifying sequences of numbers superimposed on a content without using an original content is preferred. Nevertheless, in the prior art, there has not been an effective method for precisely detecting sequences of numbers embedded in a content without using an original content.

BRIEF SUMMARY OF THE INVENTION

Accordingly, the present invention is directed to provide a digital watermark detecting device and a digital watermark detecting method that detect a sequence of numbers as a digital watermark embedded in a content at lower costs and in more precise manners.

According to an embodiment of the present invention, a digital watermark detecting device comprises a sequence generator configured to generate a predetermined sequence of numbers corresponding to a watermark which is to be detected;

a shift circuit configured to shift the digital content in unit of a predetermined part of data in predetermined directions, and obtain a predetermined number of shifted contents;

a correlation calculator configured to divide the digital content and the shifted contents into blocks, arrange predetermined data obtained from the blocks of the contents to form sequences of numbers for each of the digital content and the shifted contents, and calculate correlations between the predetermined sequence of numbers and the sequences of numbers; and a determination unit configured to determine whether the predetermined sequence of numbers exists in the digital content based on the correlations.

According to an embodiment of the present invention, a digital watermark detecting method comprises generating a predetermined sequence of numbers corresponding to a watermark which is to be detected; shifting the digital content in unit of a predetermined part of data in predetermined directions to obtain a predetermined number of shifted contents; dividing the digital content and the shifted contents into blocks; arranging predetermined data obtained from the blocks of the contents to form sequences of numbers for each of the digital content and the shifted contents; calculating correlations between the predetermined sequence of numbers and the sequences of numbers; and determining whether the predetermined sequence of numbers exists in the digital content based on the correlations.

BRIEF DESCRIPTION OF THE SEVERAL VIEWS OF THE DRAWING

FIG. 3 is a flow chart showing an example of processing procedures in the digital watermark embedding device according to the embodiment;

FIG. 4 is a diagram for explaining about a block;

FIGS. 5A and 5B are diagrams explaining about a block;

FIG. 13 is a diagram for explaining about block values;

FIG. 14 is a diagram for explaining about shift;

FIG. 15 is a diagram for explaining about shift;

FIG. 16 is a diagram for explaining about shift;

FIG. 17 is a diagram for explaining about shift;

DETAILED DESCRIPTION OF THE INVENTION

An embodiment of a digital watermark detecting device apparatus according to the present invention will now be described with reference to the accompanying drawings.

The present invention may be applicable for embedding various watermark information (for example, identification information including copyright owner of contents and users, copyright information of the copyright owner, utilization conditions of the contents, secrecy information at the usage thereof, copy control information and the like, and combinations thereof) into a digital content (for example, digitalized still image data, motion picture image data, audio data, music data and the like) for various purposes (for instance, copyright protection including usage control and copy control, promotion of secondary utilization, and the like), and detecting such watermark information from the content.

First, the principle of digital watermark detection will be explained hereafter.

When an original content is defined as I(x), and a digital watermark is defined as w(x), a watermark embedded contents I' (x) is expressed as shown below. The detection method for obtaining the digital watermark w(x) explained in the prior art is a method wherein w(x) that satisfies the following relation is determined to be embedded digital watermark. Σ represents addition about x. "th" is a threshold for determination.

$$\Sigma w(x) \cdot (I'(x) - I(x)) > th$$

The left side of the above relation can be converted as below.

$$\Sigma w(x) \cdot I'(x) - \Sigma w(x) \cdot I(x)$$

The method of the present embodiment is to obtain the second term of the left side Σw(x)·I(x) even when the original content is not clear. Σw(x)·I(x) can be approximately expressed as follows if a self-correlation Σw(x)·w(x+Δx) is very small for a non-zero Δx.

$$\sum w(x) \cdot I(x) \approx \sum w(x) \cdot I(x + \Delta x) \approx \sum w(x) \cdot I'(x + \Delta x)$$

where the last equality can be derived by applying the following approximation.

$$\because \sum w(x) \cdot I'(x + \Delta x) =$$
$$\sum w(x) \cdot I(x + \Delta x) + \sum w(x) \cdot w(x + \Delta x) = \sum w(x) \cdot I(x + \Delta x)$$

Namely, the determination equation for detection can be expressed as shown below.

$$\Sigma w(x) \cdot I'(x) - \Sigma w(x) \cdot I'(x + \Delta x) > th$$

Therefore, even without knowing the original content, when the difference between the correlation of the watermark embedded content I' (x) to the digital watermark and the correlation of shift content to the digital watermark is a threshold or more, it is possible to determine that the digital watermark is the actually embedded watermark.

First Embodiment

Figure 1:
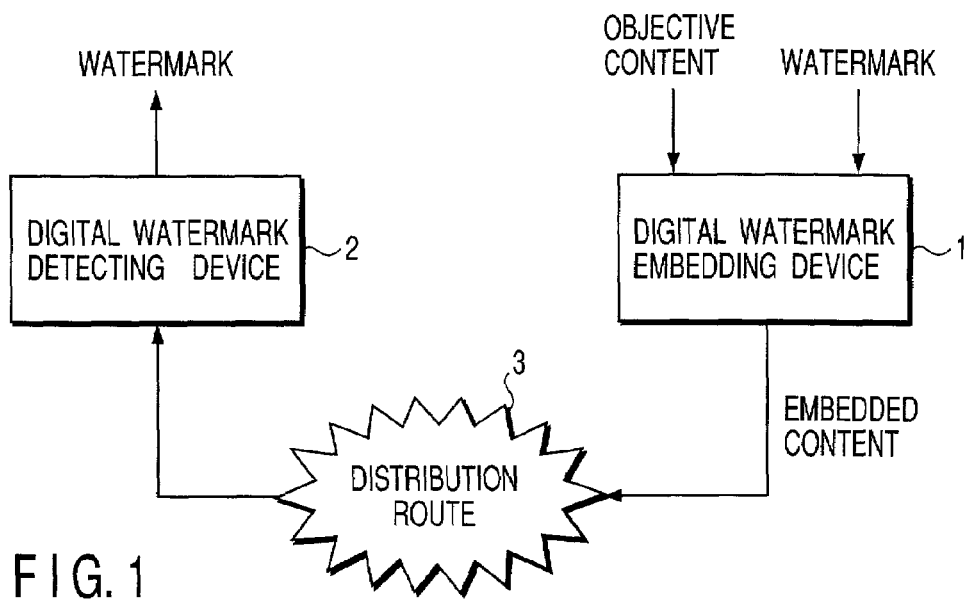
FIG. 1 is a schematic diagram showing a structure of a contents distribution system including a digital watermark embedding device and a digital watermark detecting device according to one embodiment of the present invention.

FIG. 1 is a conceptual diagram showing a structure of a system to which a digital watermark embedding device and a digital watermark detecting device according to one embodiment of the present invention are applied.

The digital watermark embedding device 1 is a device that embeds a digital watermark into an embedding object content, to which an objective content and the watermark to be embedded therein are input, and from which a digital watermark embedded content is output. This digital watermark embedding device 1 is provided and controlled, for example, at the content provider side.

The digital watermark embedded content obtained from the digital watermark embedding device 1 is distributed via a distribution route 3 with a storage medium, a communication medium and the like as media.

The digital watermark detecting device 2 is a device that detects the watermark from a detection objective content, to which the objective content is input, and from which the detected watermark is output. In FIG. 1, the digital watermark detecting device 2 is supposed to be built in a content use device at the user side (for example, a computer having a content use function, or an AV player, etc.) for the purpose of copyright protection at use of content. Of course, it can be arranged at the content provider side for the purpose for the content provider side to detect the digital watermark from a distributed content.

The digital watermark embedding device 1 can be realized both as software (program) and as hardware. Similarly, the digital watermark detecting device 2 can be realized both as software (program) and as hardware. However, when the digital watermark detecting device 2 is built in the content use device at the user side, it is preferable to build it in safely so that operations, analysis or attacks could not be made on the digital watermark detecting device 2 by users.

Meanwhile, the structural drawings shown hereinafter may stand as function block diagrams of a device, and also stand as function module diagrams or procedure diagrams of software (program).

In this embodiment, explanations are made with a case where still image data is mainly employed as an example of a digital content. Of course, data of other media can be also employed.

First, the digital watermark embedding device 1 according to the present embodiment will be explained hereafter.

Figure 2:
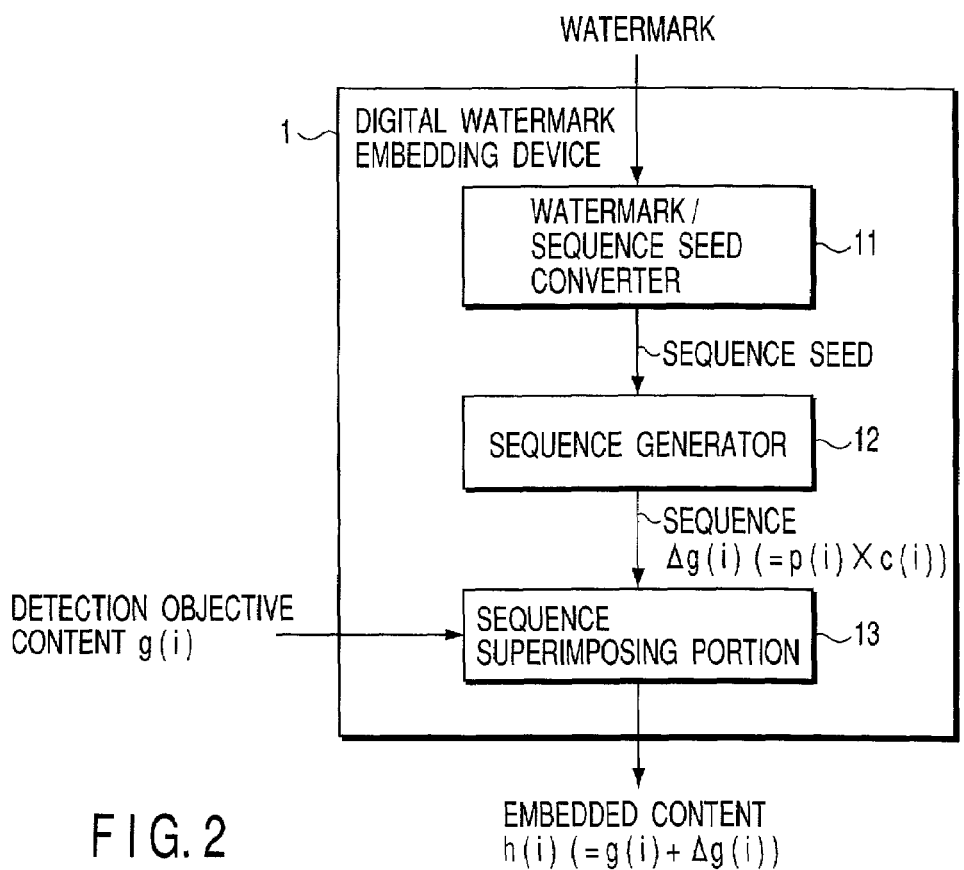
FIG. 2 is a diagram showing a structural example of the digital watermark embedding device according to the embodiment.

As shown in FIG. 2, the digital watermark embedding device 1 comprises a watermark/sequence seed converter 11, sequence generator 12, and sequence superimposing portion 13.

FIG. 3 shows an example of processing procedures in the digital watermark embedding device 1. An embedding objective content is input (step S1), and a sequence of numbers to be superimposed onto the content is generated (step S2), and the generated sequence of numbers is superimposed onto the content (step S3), and an embedded content is output (step S4).

Watermark information to be embedded is input to the watermark/sequence seed converter 11, and a sequence seed corresponding to the input watermark information is obtained. The sequence seed is some information to be the basis on which a sequence of numbers superimposed onto a content is calculated. If the information is changed, the sequence of numbers to be generated is also changed.

The sequence generator 12 generates a sequence of numbers corresponding to the sequence seed obtained by the watermark/sequence seed converter 11 as the sequence to be superimposed onto a content (step S2). The sequence generator 12 can be structured by use of, for example, a random number generator such as M-series sequence generator or the like. Or it can be configured in another structure, for example, wherein a sequence of numbers corresponding to each sequence seed is stored in advance, and a sequence of numbers corresponding to the given sequence seed is output. Further, it can be configured in other various structures. The sequence seed can be configured in various structures, for example, an initial value of a random number generator, an identification number corresponding to a sequence of numbers, and the like.

As a sequence to be superimposed onto a content, for example, a binary sequence such as 0–1 sequence or (+1)–(−1) sequence, an integer sequence of a predetermined range, an actual number sequence of predetermined range and the like may be employed. This sequence is, for example, a pseudo-random number sequence. It is preferable that sequences corresponding to different watermarks, i.e., different sequence seeds, are not correlated to each other, or weakly correlated with each other.

The sequence superimposing portion 13 superimposes the sequence generated by sequence generator 12 onto an objective content (step S3).

Details of each portion in FIG. 2 are explained hereafter. First, the watermark/sequence seed converter 11 is explained.

The watermark/sequence seed converter 11 obtains a sequence seed corresponding to a given watermark. For example, when control information indicating whether or not copying is available is embedded as a watermark to be embedded, if copy availability is designated as a watermark to be embedded, a sequence seed {x1} is output, while if copy prohibition is designated, a sequence seed {x2} is output. For example, when an identification number of a user or the like is embedded as a watermark, if an identification number "n" is designated as a watermark to be embedded, a sequence seed {x(n)} is output. For example, when control information indicating whether or not copy is available and an identification number of a user are embedded as a watermark, if copy availability and identification number "n" are designated as a watermark, a sequence seed {x(2n)} is output, while, if copy prohibition and identification number "n" are designated, a sequence seed {x(2n+1)} is output. Of course, these are just examples, and various methods may be applied.

When giving a sequence seed corresponding to the watermark from the outside, the watermark/sequence seed converter 11 is unnecessary.

Next, the sequence generator 12 and sequence superimposing portion 13 will be explained hereafter.

In this embodiment, a content is divided into plural blocks in accordance with a predetermined division method, and a value of predetermined content data of each block is changed, thereby a digital watermark is embedded.

For example, when a content is image data, the image data is divided into plural blocks as shown in FIG. 4. FIG. 4 shows a case wherein the image data is divided into 16 blocks for easy and simple recognition, and "i" in the figure indicates block numbers 1 to 16.

There are various methods for configuring one block. For example, when the content is image data, there are, a method wherein one block is an area consisting of one pixel, as shown in FIG. 5A, a method wherein one block is an area consisting of plural horizontally continuous pixels, a method wherein one block is an area consisting of plural vertically continuous pixels, and a method wherein one block is an area consisting of plural horizontally and vertically continuous pixels, as shown in FIG. 5B.

A value of predetermined content data of a block used for embedding of a watermark (hereinafter referred to as block value) is, for example, when a content is image data and one block consists of one pixel, a pixel value, while, when one block consists of plural pixels, is a value obtained by processing predetermined content data of the plural pixels, for example, an average value or a total value of pixel values of the plural pixels.

In the present embodiment, one element of a sequence corresponding to a watermark to be embedded is superimposed onto each block.

Figures 6, 7, 8:
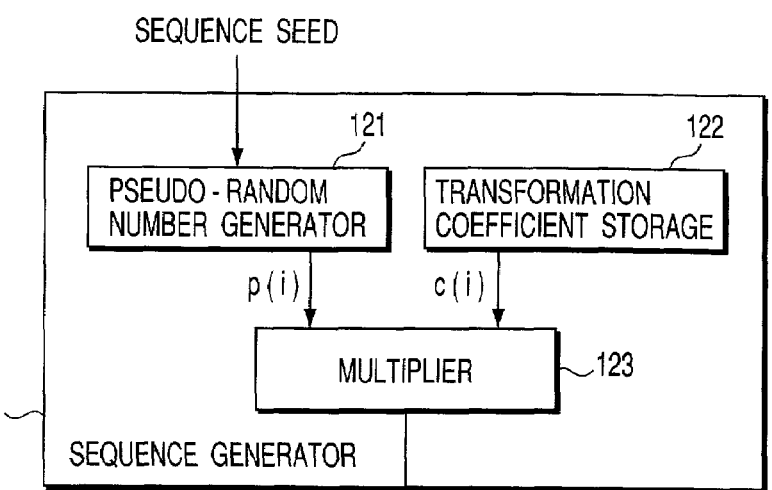
FIG. 6 is a diagram for explaining about block values.
FIG. 7 is a diagram for explaining about superimposing of sequence elements onto block values.
FIG. 8 is a diagram showing a structural example of a sequence generator of the digital watermark embedding device according to the embodiment.

As shown in FIG. 6, it is assumed that a block value of an i-th block of a content is represented by $g(i)$, and an i-th element of the sequence is represented by $\Delta g(i)$. To the block value $g(i)$ of the i-th block of a content, the i-th element $\Delta g(i)$ of the sequence is superimposed. A block value $h(i)$ of the i-th block of a content after superimposing becomes $h(i)=g(i)+\Delta g(i)$. The conditions at this moment are illustrated in FIG. 7.

Herein, explanations are made mainly on a method where digital watermark is embedded in each block of a content in the time and space region (pixel range in the case of image data), and digital watermark is detected on the basis of each block of a content in the time and space region (pixel range in the case of image data). In addition, there are a method wherein content data of the time and space region is once transformed to data of the frequency region by an orthogonal transformation, and a digital watermark is embedded to each block to the data of the frequency region, and again, the data of the frequency region is inverse transformed to the data of the time and space region by a inverse orthogonal transformation, and a method wherein content data of the time and space region is transformed to data of the frequency region by an orthogonal transformation, and a digital watermark is detected on the data of the frequency region.

With respect to the sequence to be superimposed $\Delta g(i)$, there may be many variations, for example, as shown below:
- a method using a pseudo-random number sequence,
- a method using a frequency transformation base,
- a method using a sequence obtained by linear combining plural frequency element bases with a sequence of pseudo-random numbers as coefficients,
- a method using a sequence obtained by multiplying a sequence of pseudo-random numbers and a frequency transformation base, and the like.

It is necessary that a self-correlation $\Sigma g(i) \cdot g(i+\Delta i)$ is very small for a non-zero $\Delta i$.

Hereafter, two structural examples of the sequence generator 12 will be shown.

FIG. 8 shows a structural example of the sequence generator 12. As shown in FIG. 8, the sequence generator 12A comprises a pseudo-random number generator 121, transformation coefficient storage 122 for storing transformation coefficients of frequency transformation, and multiplier 123.

The pseudo-random number generator 121 generates pseudo-random numbers p(1), p(2), . . . , p(M), by the numbers M corresponding to the preset numbers of blocks on the basis of the given sequence seed.

On the other hand, the transformation coefficient storage 122 stores transformation coefficients of frequency transformation c(1) to c(M).

The multiplier 123 multiplies an i-th element p(i) of the sequence generated by the pseudo-random number generator 121, by an i-th transformation coefficient c(i) of frequency transformation read from the transformation coefficient storage 122, and generates a sequence of numbers p(1)×c(1), p(2)×c(2), . . . , p(M)×c(M). This sequence p(i)×c(i) becomes $\Delta g(i)$ (i=1 to M).

Namely, in this example, the sequence superimposing portion 13 inputs an objective content, and the sequence $\Delta g(i)(=p(1)\times c(1), p(2)\times C(2), \ldots, p(M)\times c(M))$, and obtains a block value g(i) for each block of a content, and changes the value of content data in each block so that a block value h(i) after superimposing become the value $g(i)+\Delta g(i)=g(i)+p(i)\times c(i)$ as the result of addition of the i-th element of the sequence of numbers $\Delta g(i)=p(i)\times c(i)$ to a block value g(i) before superimposing.

Figure 9:
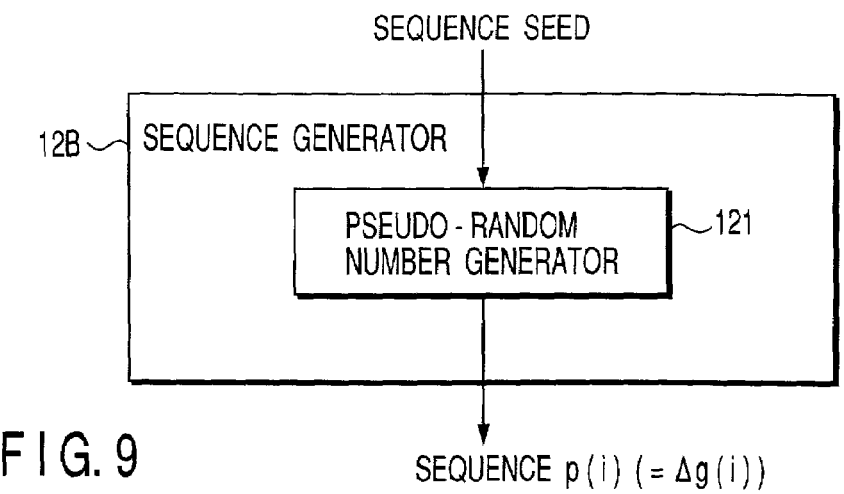
FIG. 9 is a diagram showing another structural example of the sequence generator of the digital watermark embedding device according to the embodiment.

FIG. 9 shows another structural example of the sequence generator 12. As shown in FIG. 9, the sequence generator 12B includes the pseudo-random number generator 121. The pseudo-random number generator 121 generates pseudo-random numbers p(1), p(2), . . . , p(M), by the numbers M corresponding to the preset numbers of blocks, on the basis of the given sequence seed. This sequence p(i) becomes $\Delta g(i)$.

Namely, in this example, the sequence superimposing portion 13 inputs an objective content, and the sequence p(1), p(2), . . . , p(M), and obtains a block value g(i) for each block of a content, and changes the value of content data in each block so that a block value h(i) after superimposing become the value $g(i)+\Delta g(i)=g(i)+p(i)$ as the result of addition of the i-th element of the sequence $\Delta g(i)=p(i)$ to block value g(i) before superimposing.

As described later in details, it is possible to obtain an estimation value of the frequency component before superimposing based on a shifted content and a correlation value $CR(\mu, \nu)$ of the sequence of numbers. It is possible to determine whether or not the digital watermark is embedded based on the estimation value and the actual value of the frequency component.

When the content is image data, if one block consists of one pixel, predetermined content data of the image, for example, a pixel value is changed so as to become $g(i)+\Delta g(i)$.

While, if one block consists of plural pixels, predetermined content data of each pixel, for example, a pixel value is changed so that the value obtained by processing predetermined content data of the plural pixels, for example, an average value of pixel values of the plural pixels or a total value thereof should become $g(i)+\Delta g(i)$. In this case, for example, an identical value ($\Delta g(i)$/number of pixels) may be written into plural pixels that configure one block, or different values may be written to pixels through dispersion by an appropriate method. In such a method, a structure may be made so as to carry out changes that may cause least deterioration of image quality.

As mentioned heretofore, a digital watermark embedded content obtained by the digital watermark embedding device 1 is distributed via the distribution route 3 with a storage medium, a communication medium and the like as media.

In the next place, the digital watermark detecting device 2 according to the present embodiment will be explained in detail hereafter.

Figure 10:
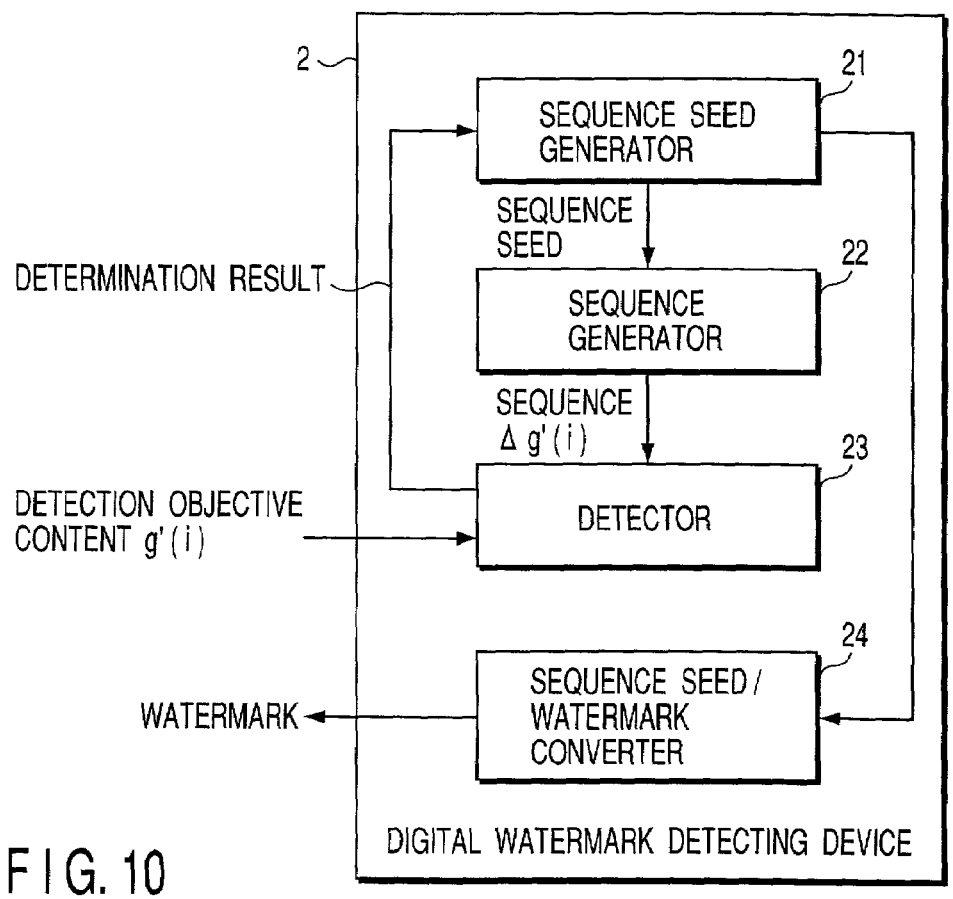
FIG. 10 is a diagram showing a structural example of the digital watermark detecting device according to the embodiment.

As shown in FIG. 10, the digital watermark detecting device 2 comprises a sequence seed generator 21, sequence generator 22, detector 23, and sequence seed/watermark converter 24.

Figure 11:
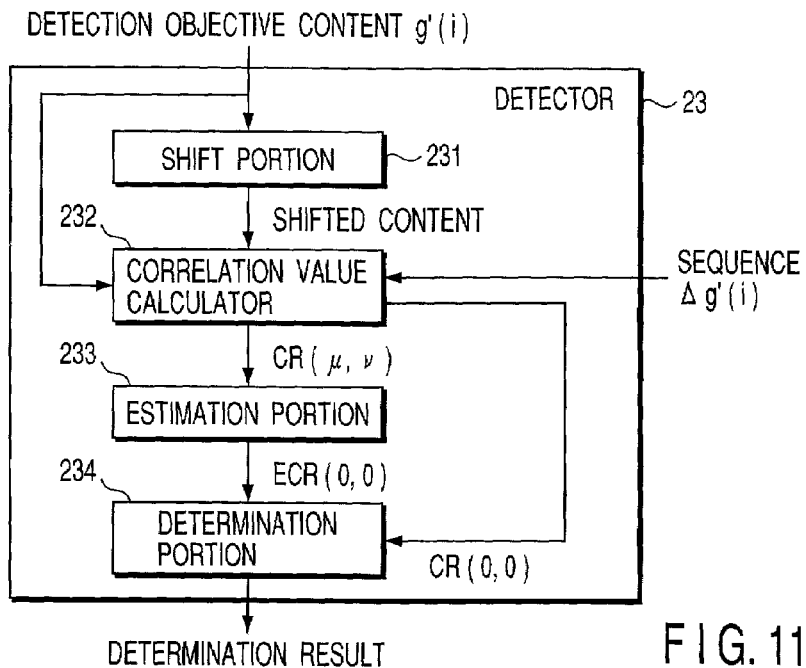
FIG. 11 is a diagram showing a structural example of a detector of the digital watermark detecting device according to the embodiment.

FIG. 11 shows a structural example of the detector 23. The detector 23 comprises a shift portion 231, correlation value calculator 232, estimation portion 233, and determination portion 234.

In the present embodiment, at detection of watermark, a certain watermark is assumed (certain sequence seed is assumed), and a correlation value between the sequence corresponding to the watermark and generated on the basis of the assumed sequence seed and the block value of an objective content on which a sequence corresponding to some watermark is assumed to be embedded is calculated. If there is correlation (for example, if the correlation value is a preset reference value or more), it is determined that the sequence corresponding to the assumed certain watermark and generated on the basis of the assumed certain sequence seed has been embedded in the objective content. At this moment, in the present embodiment, an original content is not used, but on the basis of the correlation value of a shifted content in which the content is shifted, for example, with block as unit, as described later and a sequence of numbers, the correlation value of the original content and the sequence of numbers is estimated. The correlation value of the objective content and the sequence of numbers are compared with the estimated correlation value, thereby presence or absence of correlation is determined.

Figure 12:
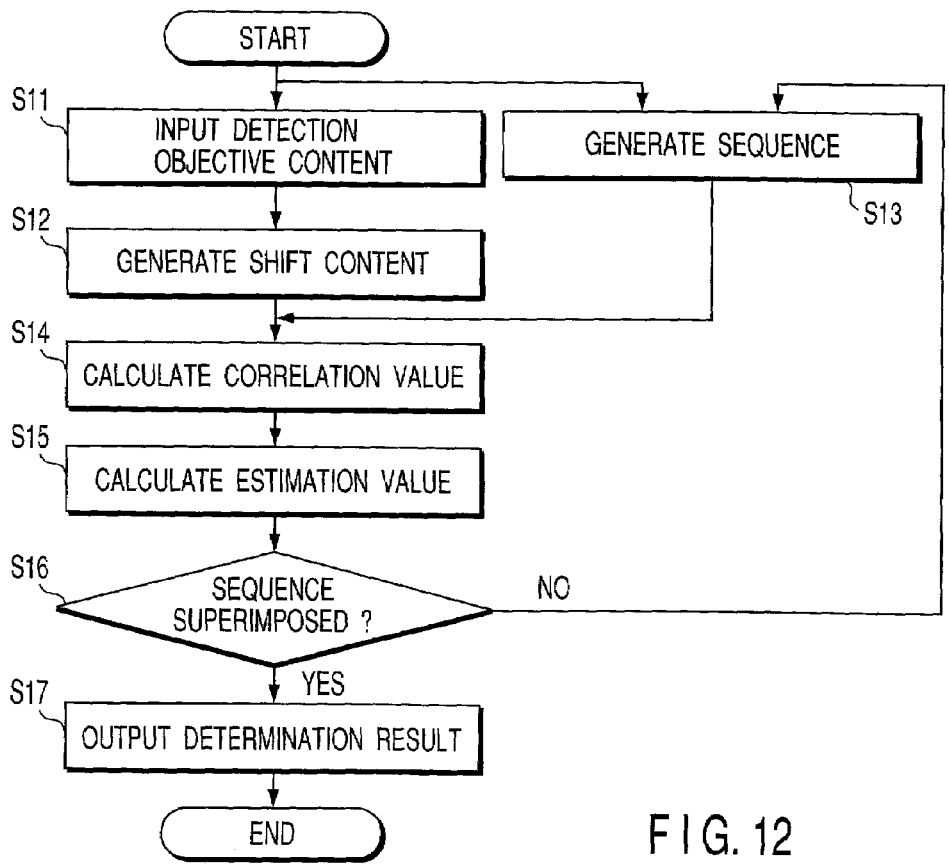
FIG. 12 is a flow chart showing an example of processing procedures in the digital watermark detecting device according to the embodiment.

FIG. 12 shows an example of detection procedures in the digital watermark detecting device 2 shown in FIG. 10. An embedding objective content is input (step S11), a shift content is generated (step S12), and a sequence of numbers that may be superimposed on the content is generated (step S13). The correlation values of the objective content, shifted content and the generated sequence are calculated (step S14). The correlation value of the original content is estimated (step S15). It is determined whether or not the sequence of the numbers is superimposed on the objective content based on the correlation value of the objective content and the estimated correlation value of the original content (step S16). A determination result is output (step S17).

This processing is repeated until it is determined that the sequence of the numbers is superimposed on the objective content at step S16. When it is determined that the sequence is superimposed on the objective content, a corresponding watermark is output. When candidates of all the sequences are not detected from the objective content, processing is carried out by a predetermined method. Or, this processing may be carried out, not until it is determined that the sequence is superimposed on the objective content, but on all the sequence candidates, and the sequence with the highest possibility of superimposing therein may be found out.

The sequence seed generator 21 in FIG. 10 generates a sequence seed that may have been used when the watermark was embedded into the objective content (in the case of FIG. 2, the sequence seed that may be output from the watermark/sequence seed converter 11) (step S13). When there are plural sequence seed candidates, until a determination result showing that a sequence is detected is received from the determination portion 234 of detector 23 (step S16), the sequence seed candidates are output in the predetermined order. When a determination result showing that a sequence is detected is received, the sequence seed that has given the determination result is output to the sequence seed/watermark converter 24 (step S17). When a determination result showing that a sequence has not been detected on all the sequence seeds is received, information to that effect that the corresponding sequence seed does not exist is output to the sequence seed/watermark converter 24.

The sequence generator 22 of the digital watermark detecting device 2 has a structure basically similar to the sequence generator 12 of the digital watermark embedding device 1, and generates a sequence $\Delta g'(i)$ corresponding to the sequence seed supplied from the sequence seed generator 21, as a candidate of a sequence superimposed on the content.

An objective content g' (i) and the sequence $\Delta g'(i)$ from the sequence generator 22 are supplied to the detector 23. The objective content g' (i) is supplied to the shift portion 231 and the correlation calculator 232, while the sequence $\Delta g'(i)$ is supplied to the correlation calculator 232.

The shift portion 231 shifts the content. For example, when the content is image data, the shift portion 231 creates image data wherein the image data is shifted by offset in a predetermined space direction or time direction. In the case of music data, the shift portion 231 creates music data wherein the music data is shifted by offset in the time direction.

For example, in the case of image data, it is assumed that a block value of each block of image g(i)=g(x, y) is designated by two dimensional coordinate i=x+(y−1)×W. Wherein, W is the width of image. "x" changes from 1 to the image width W, while "y" changes from 1 to the image height H. In this case, the shift portion 231 generates image data wherein (x+$\mu$, y+$\nu$) element of input image data is (x, y) element thereof.

There are many variations in taking shift amount. For example, there are a method wherein a shift content is generated with respect to two shifts whose shift amount ($\mu$, $\nu$) are (1, 0) and (−1, 0), a method wherein shift content is generated with respect to two shifts whose shift amount ($\mu$, $\nu$) are (0, 1) and (0, −1), a method wherein shift content is generated with respect to four shifts whose shift amount ($\mu$, $\nu$) are (1, 0), (−1, 0), (0, 1) and (0, −1), a method wherein shift content is generated with respect to four shifts whose shift amount ($\mu$, $\nu$) are (1, 1), (1, −1), (−1, 1) and (−1, −1), a method wherein shift content is generated with respect to eight shifts whose shift amount ($\mu$, $\nu$) are (1, 0), (−1, 0), (0, 1), (0, −1), (1, 1), (1, −1), (−1, 1) and (−1, −1), and the like. Of course, a shift wherein at least one of $\mu$ and $\nu$ is set 2 or more may be included. Besides these, various methods may be used.

The correlation value calculator 232 calculates the correlation value of the block value of each block of objective content and the sequence $\Delta g'(i)(=\Delta g'(x, y))$, and the correlation value of the block value of each block of each shifted content (shifted image) and the sequence $\Delta g'(i)(=\Delta g'(x, y))$.

The correlation value calculator 232 obtains a block value (described as g'(i) hereafter) of each block of a given objective content that has not been shifted. FIG. 13 shows an example where content is image data. As same as FIG. 4, FIG. 13 shows a case wherein image data is divided into 16 blocks for easy and simple recognition, and "i" in the figure indicates block numbers 1 to 16.

The correlation value calculator 232 obtains the block value g' (i) of each block of the given objective content (shifted content) supplied from the shift portion 231. In this case too, block numbers are same as in the case of FIG. 13.

It is shown the value of each block becomes same as that of which block in the case of FIG. 13 (($\mu$, $\nu$)= (0, 0)), in FIG. 14, in the case of ($\mu$, $\nu$)=(0, 1), in FIG. 15, in the case of ($\mu$, $\nu$)=(1, 0), in FIG. 16, in the case of ($\mu$, $\nu$)=(−1, −1), and in FIG. 17, in the case of ($\mu$, $\nu$)=(1, 1), respectively. For example, the value of g'(1)(=g'(1, 1)) in the case of ($\mu$, $\nu$)=(1, 1) in FIG. 17 becomes same as that of g'(16) (=g'(4, 4)) in the case of ($\mu$, $\nu$)= (0, 0) in FIG. 13.

In the next place, the correlation value calculator 232 calculates the correlation value CR ($\mu$, $\nu$) of the block value g'(i)(=g'(x, y)) of each block of the shifted content (shifted image) with a shift amount ($\mu$, $\nu$) and the sequence $\Delta g'(i)$ (=$\Delta g'(x, y)$). Namely, g'(i)×$\Delta g'(i)$ is totaled about all i's.

For example, when the content is image data, g'(x, y)×$\Delta g'$(x, y) is totaled about all x, y, as shown below.

$$CR(\mu, \nu) = \sum_{x,y} g'(x, y) \times \Delta g'(x, y)$$

For example, when eight shifted contents are used whose shift amounts ($\mu$, $\nu$) are (1, 0), (−1, 0), (0, 1), (0, −1), (1, 1), (1,−1), (−1, 1) and (−1, −1), the correlation values CR ($\mu$, $\nu$) are obtained to the eight kinds respectively. The correlation values CR ($\mu$, $\nu$) are supplied to the estimation portion 233.

Further, the correlation value calculator 232 calculates the correlation value CR (0, 0) of the detection objective content that is not shifted in the same manner as described above. This is the correlation value for the shift amount (0, 0). The correlation value CR (0, 0) is supplied to the determination portion 234.

The estimation portion 233 obtains an estimation value ECR (0, 0) of the correlation value of the original content of shift amount (0, 0) before embedding watermark on the basis of CR ($\mu$, $\nu$) supplied from the correlation value calculator 232.

For example, when the method is used wherein the shifted content is generated with respect to eight shifts whose shift amounts ($\mu$, v) are (1, 0), (−1, 0), (0, 1), (0, −1), (1, 1), (1, −1), (−1, 1) and (−1, −1), for example, the estimated correlation value ECR (0, 0) is calculated in accordance with the followings.

$$ECR(0, 0) = \{CR(1, 0) + CR(-1, 0) + CR(0, 1) + CR(0, -1)\}/2 +$$
$$\{CR(1, 1) + CR(1, -1) + CR(-1, 1) + CR(-1, -1)\}/4$$

Of course, the above is just one example, and many variations may be applied for obtaining ECR (0, 0).

In the next place, the determination portion 234 determines whether or not a digital watermark is embedded, on the basis of CR (0, 0) supplied from the correlation value calculator 232 and ECR (0, 0) supplied from the estimation portion 233, and outputs the determination result.

For example, if the following relation stands to a certain threshold th, the determination portion 234 determines that the sequence supplied from the sequence generator 22 has been embedded into the objective content, otherwise, it determines not.

|CR(0, 0)−ECR(0, 0)|>th

Herein, the correlation value CR (0, 0) is expected to have a larger value than the correlation value before embedding (CR (0, 0) in the case of calculation on the original content) when the objective content is that after embedding the watermark corresponding to the assumed sequence. On the other hand, even when the objective content is that after embedding the watermark corresponding to the assumed sequence, the correlation values CR ($\mu$, v) in the shifted content (for example, the shifted image) by other shift amounts than (0, 0) have the correlation with a sequence shifted to the sequence used in embedding, accordingly, they in general do not take a large correlation value. Further, in a natural content, content data changes moderately (for example, in image data, pixel value changes moderately), it may be safely said that the shift amounts ($\mu$, v) are small in comparison with the scale of the change thereof. Consequently, the correlation values CR ($\mu$, v) in the shifted content (for example, the shifted image) (by other shift amounts than (0, 0)) are expected to be close to the correlation value before shift, and ECR (0, 0) estimated on the basis thereof is expected to be close the correlation value before embedding (CR (0, 0) in the case of calculation on the original content).

The sequence seed/watermark converter 24 does the reverse conversion of the watermark/sequence seed converter 11 in the digital watermark embedding device, namely, it inputs the detected sequence seed, and obtains watermark corresponding thereto. For example, as a processing to cope with the above example, when control information showing whether or not copy is available is embedded as watermark, if a sequence seed {x1} is supplied from the sequence seed generator 21, it outputs information showing that copy is available as watermark, while, if a sequence seed {x2} is supplied, it outputs information showing that copy is not available. For example, when an identification number of a copyright owner is embedded as watermark, if sequence seed {x(n)} is supplied, it outputs identification number "n" as watermark. For example, when control information showing whether or not copy is available and an identification number of a user is embedded as watermark, if sequence seed {x(2n)} is supplied, it outputs information showing that copy is available and identification number "n" as watermark, while, if sequence seed {x(2n+1)} is supplied, it outputs information showing that copy is not available and identification number "n" as watermark. Of course, these are just examples, and various methods may be applied. By the way, the sequence seed/watermark converter 24, when receiving information that there is no corresponding sequence seed from the sequence seed generator 21, for example, may output information indicating error, or may output predetermined watermark assuming that such preset predetermined watermark has been embedded.

When the detected sequence seed is used as watermark is detected, the sequence seed/watermark converter 24 is not necessary.

Now, the entire actions of the digital watermark detecting device 2 in FIG. 10 are carried out, for example, as described hereafter.

First, the sequence seed generator 21 outputs a certain sequence seed.

The sequence generator 22 generates a candidate Δg' of the superimposed sequence, on the basis of the sequence seed input from the sequence seed generator 21.

The shift portion 231 (FIG. 11) carries out a shift operation as mentioned above, and the correlation value calculator 232 calculates a correlation value CR (0, 0) of a detection objective content that is not shifted, and correlation values CR ($\mu$, v) with respect to other shift amounts than (0, 0) as mentioned previously.

As mentioned previously, the estimation portion 233 obtains an estimated value ECR (0, 0) of the correlation value to the original content of shift amount (0, 0) before embedding watermark on the basis of CR ($\mu$, v) supplied from the correlation value calculator 232.

The determination portion 234 makes determination from the absolute value of the difference between CR (0, 0) output from the correlation value calculator 232 and ECR (0, 0) output from the estimation portion 233, and provides a determination result showing that a sequence has been detected (hereinafter referred to as match information), or a determination result showing that a sequence has not been detected (hereinafter referred to as mismatch information), to the sequence seed generator 21.

The sequence seed generator 21 outputs another sequence seed when the mismatch information is supplied from the determination portion 234. In the same manner as mentioned above, the sequence generator 22 generates the corresponding sequence. The determination portion 234 calculates correlation, and if it determines that the sequence does not exist, then the determination portion 234 gives the mismatch information once again to the sequence seed generator 21.

The above is repeated, and the determination portion 234 makes determination from CR (0, 0) output from the correlation value calculator 232 and ECR (0, 0) output from the estimation portion 233, and if it determines that there exists the sequence, then the determination portion 234 gives match information to the sequence seed generator 21.

When the match information is supplied from the determination portion 234, the sequence seed generator 21 outputs the sequence seed at that moment to the sequence seed/watermark converter 24.

When a sequence seed is provided from the sequence seed generator 21, the sequence seed/watermark converter 24 outputs a watermark corresponding to the given sequence seed.

Hereinafter, modified examples of the first embodiment are explained.

First, in the above, a sequence seed is assumed by the sequence seed generator 21, and according to a correlation determination result, trials and errors are made, however, instead of the above, a watermark may be assumed, and according to the correlation determination result, trials and errors may be made.

Figure 18:
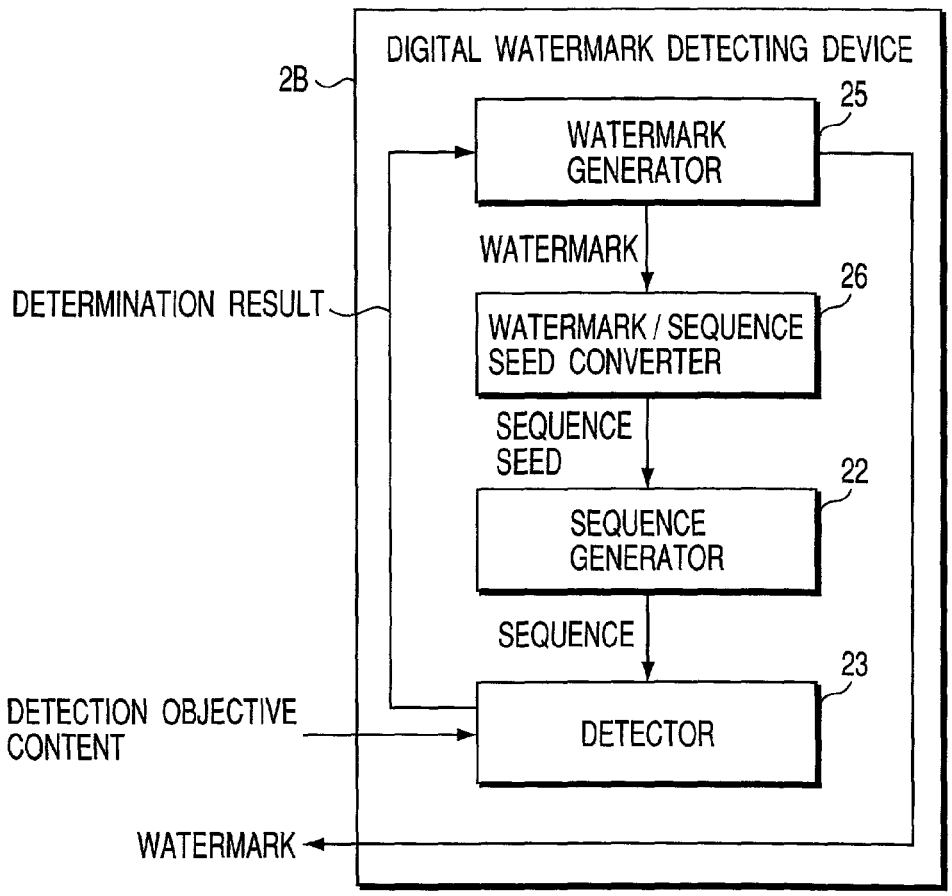
FIG. 18 is a schematic diagram showing another structural example of the digital watermark detecting device according to the embodiment.

FIG. 18 shows a structural example of a digital watermark detecting device 2B for this case. In this case, in place of the sequence seed generator 21 and sequence seed/watermark converter 24 in FIG. 10, a watermark generator 25 and watermark/sequence seed converter 26 are arranged. This structural example is basically same as that shown in FIG. 10, therefore, different points are mainly explained hereafter.

First, the watermark generator 25 outputs a certain watermark.

The watermark/sequence seed converter 26 outputs the sequence seed corresponding to the watermark supplied from the watermark generator 25.

The sequence generator 22 generates a candidate $\Delta g'$ of the superimposed sequence on the basis of the sequence seed input from the watermark/sequence seed converter 26.

The shift portion 231 (FIG. 11) carries out a shift operation as mentioned previously, and the correlation value calculator 232 calculates correlation value CR (0, 0) and correlation values CR $(\mu, \nu)$ with respect to other shift amounts than (0, 0) as mentioned previously.

The estimation portion 233 estimates ECR (0, 0) based on the correlation values CR $(\mu, \nu)$ with respect to other shift amounts than (0, 0) as mentioned previously.

The determination portion 234 makes determination based on CR (0, 0) output from the correlation value calculator 232 and ECR (0, 0) output from the estimation portion 233, and provides match information or mismatch information to the watermark generator 25.

When the mismatch information is supplied from the determination portion 234, the watermark generator 25 outputs another watermark. In the same manner as mentioned above, the sequence generator 22 generates the corresponding sequence. In the same manner, the determination portion 234 calculates correlation, and if it determines there is not the sequence, the determination portion 234 gives the mismatch information once again to the watermark generator 25.

The above is repeated, and the determination portion 234 makes determination from CR (0, 0) output from the correlation value calculator 232 and ECR (0, 0) output from the estimation portion 233, and if it determines that there exists the sequence, then the determination portion 234 gives the match information to the watermark generator 25.

When the determination result showing match is supplied from the determination portion 234 of the detector 26, the watermark generator 25 outputs the watermark at the moment.

Second, in the above, one of a plurality of sequence seeds and one of a plurality of watermarks are assumed, and trials and errors are made in accordance with the correlation determination result, while, there may be a case wherein only whether or not a specific watermark is embedded is detected. For example, when carrying out copy control by a watermark, instead of checking whether a watermark showing copy availability is embedded in the objective content, or a watermark showing copy prohibition is embedded therein, and making copy available when the watermark showing copy availability is embedded, whether or not the watermark showing copy availability is embedded in the objective content is determined, and if the watermark showing copy availability is not embedded, copy is made available, while, if the watermark showing copy prohibition is embedded therein, the objective content is considered as copy prohibited, and copy is prohibited.

Figure 19:
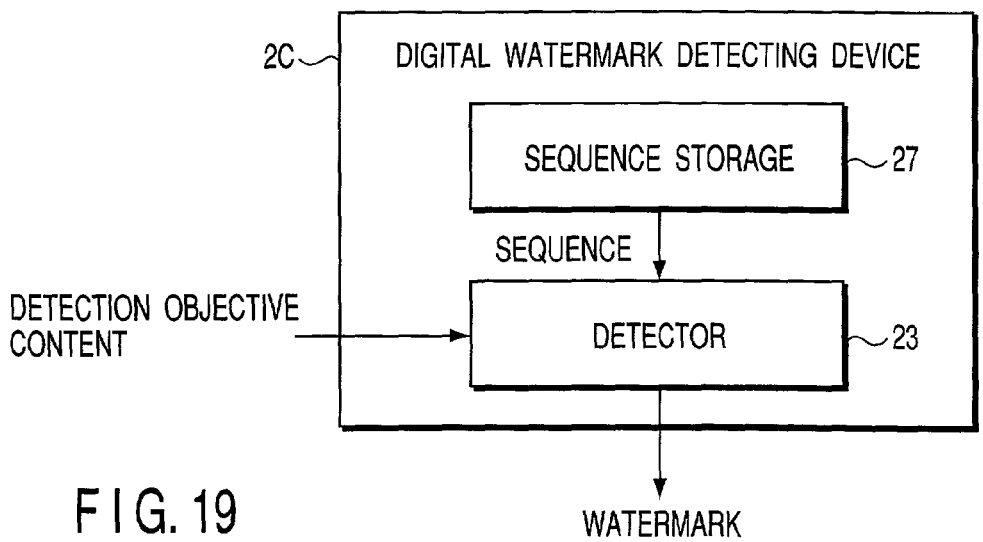
FIG. 19 is a schematic diagram showing still another structural example of the digital watermark detecting device according to the embodiment.

FIG. 19 shows a structural example of a digital watermark detecting device 2C in this case. In this case, the detector 23 in FIG. 10 and FIG. 18, and a sequence storage 27 are provided. This structural example is basically same as the structural example in FIG. 10 and FIG. 18 except that trials and errors are made on candidates, therefore, different points are mainly explained hereafter.

In this case, the sequence storage 27 stores sequence $\Delta g'$ corresponding to a specific watermark, for instance, a sequence corresponding to copy availability. This sequence is supplied to the detector 23.

The shift portion 231 (FIG. 11) carries out a shift operation as mentioned previously, and the correlation value calculator 232 calculates correlation value CR (0, 0) and CR $(\mu, \nu)$ with respect to other shift amounts than (0, 0) as mentioned previously.

The estimation portion 233 estimates ECR (0, 0) based on CR $(\mu, \nu)$ with respect to other shift amounts than (0, 0) as mentioned previously.

The determination portion 234 makes determination based on CR (0, 0) output from the correlation value calculator 232 and ECR (0, 0) output from the estimation portion 233, and when the corresponding sequence is detected, it outputs a specific watermark (for instance, a watermark showing copy availability), while when the corresponding sequence is not detected, it outputs information showing an error or other preset watermark (for instance, watermark showing copy prohibition).

Third, the method wherein a digital watermark is embedded into each block of a content in the time and space region (pixel area in the case of image data), and the digital watermark is detected on the basis of each block of a content in the time and space region (pixel area in the case of image data) has been explained so far. Hereafter, a method wherein content data of the time and space region is once converted into data of the frequency region by an orthogonal transformation, and a digital watermark is embedded to each block to the data of the frequency region, and again, the data of the frequency region is returned to the time and space region by an inverse orthogonal transformation, and a method wherein content data of the time and space region is converted into data of the frequency region by an orthogonal transformation, and the digital watermark is detected on the data the frequency region, are explained.

Figures 20, 21:
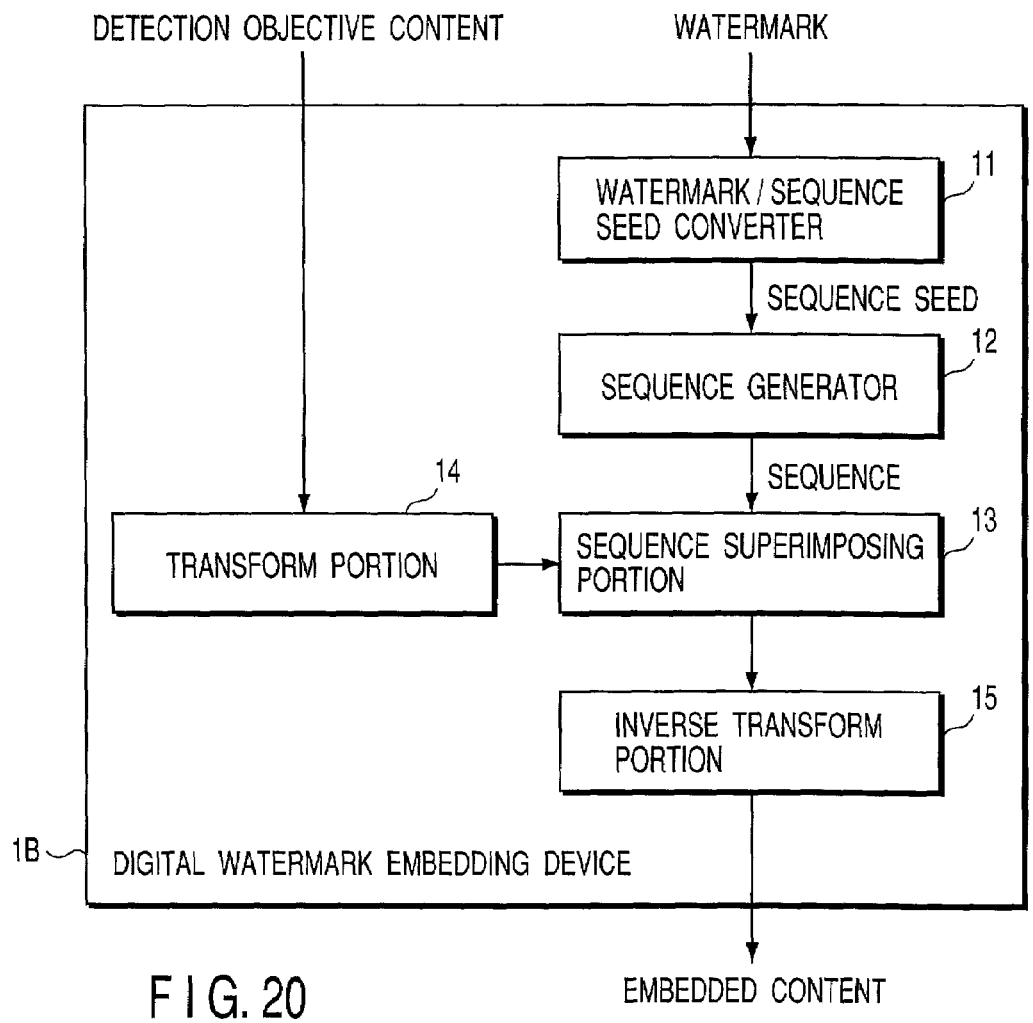
FIG. 20 is a schematic diagram showing still another structural example of the digital watermark embedding device according to the embodiment.
FIG. 21 is a diagram for explaining about block values.

FIG. 20 shows a structural example of a digital watermark embedding device 1B for this case. In this case, as shown in FIG. 20, a transform portion 14 and an inverse transform portion 15 are added to the structural example in FIG. 2. In the transform portion 14, content data of the time and space region (refer to FIG. 6) is once transformed into data of the frequency region by an orthogonal transformation (refer to FIG. 21), and in the same manner as in the structural example of FIG. 2, a sequence element is superimposed on the block value of each block to the data of the frequency region (refer to FIG. 22) in the sequence superimposing portion 13. Thereafter, by the inverse transform portion 15, the data of the frequency region may be again returned to the data of the time and space region by an inverse orthogonal transformation.

Figures 22, 23:
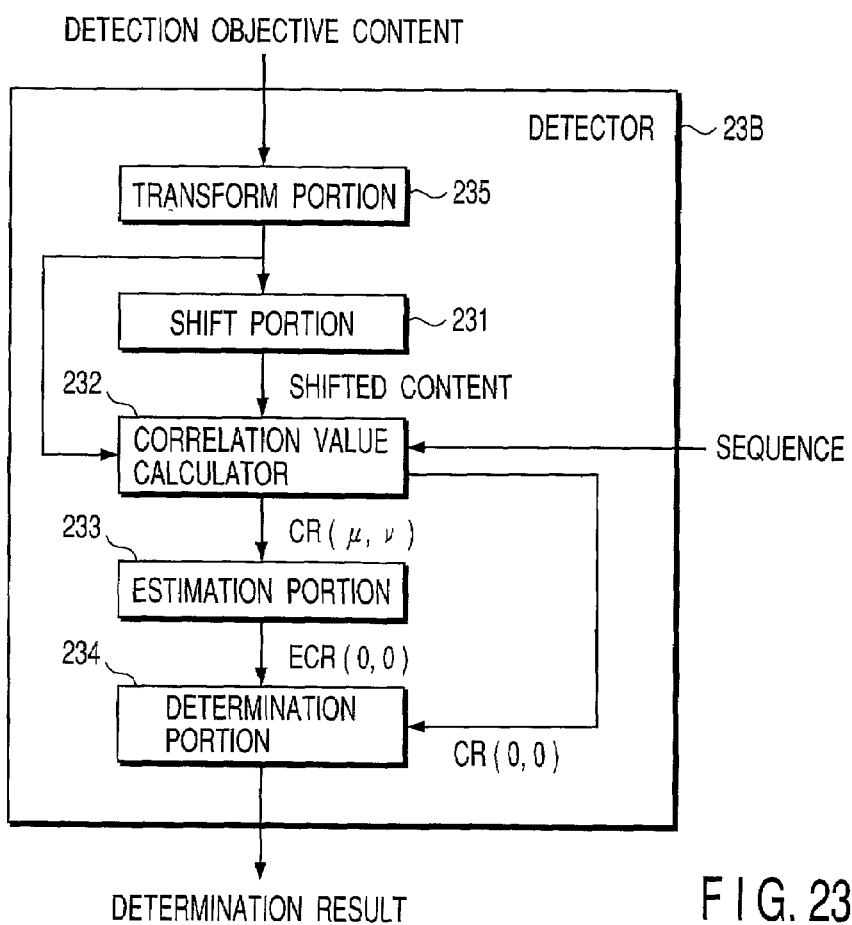
FIG. 22 is a diagram for explaining about superimposing of sequence elements onto block values.
FIG. 23 is a diagram showing another structure of the detector of the digital watermark detecting device according to the embodiment.
Figure 24A:
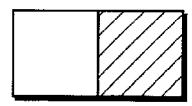
FIGS. 24A, 24B, 24C, 24D, 24E, 24F, and 24G are diagrams for explaining about examples of positional relations between images of estimated objects and shift images to be used for estimation.
Figure 24B:
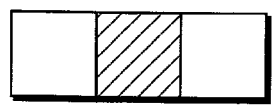
Figure 24C:
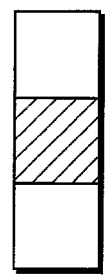
Figure 24D:
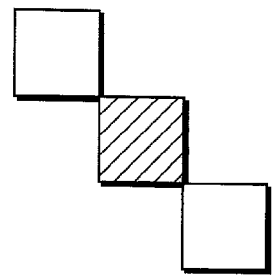
Figure 24E:
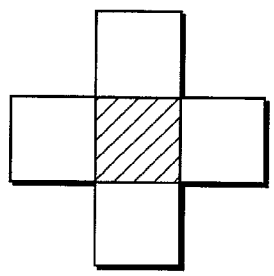
Figure 24F:
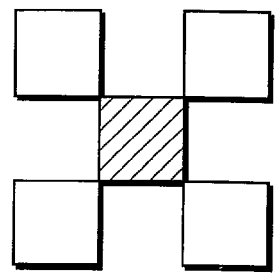
Figure 24G:
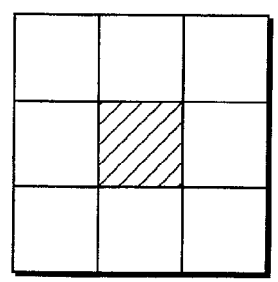

On the other hand, the structural example of the digital watermark detecting device 2 for this case is same as one explained heretofore. However, as shown in FIG. 23, the structure of a detector 23B of the digital watermark detecting device 2 is different. As shown in FIG. 23, a converter 235 is added to the structural example of FIG. 11. In the converter 235, content data of the time and space region (refer to FIG. 6) is once transformed into data of the frequency region (refer to FIG. 21) by an orthogonal transformation, and the data of the frequency region may be processed as same in the detector 23 in FIG. 11.

Besides the method wherein the time and space region is employed in embedding and detection, the method wherein the frequency region is employed in embedding and detection, there may be a method wherein if equivalent conversion of superimposing in the time and space region and superimposing in the frequency region, the time and space region is used in embedding, while the frequency region is used in detection, and a method wherein the frequency region is used in embedding, while the time and space region is used in detection.

Now hereafter, variations of content shift are explained. Explanations hereafter are made with an example wherein the content is image data, and still the case wherein the content is in other forms may be possible.

There are methods to select a shifted image as follows:
(1) Method using only one frame of shifted image.
(2) Method using a plurality of frames of shifted images.

There are cases with shift directions as follows:
(1) An image is shifted only in horizontal direction.
(2) An image is shifted only in vertical direction.
(3) An image is shifted only in diagonal direction.
(4) An image is shifted in at least one of horizontal, vertical and diagonal directions.

There are cases with shift sizes as follows:
(1) An image is shifted in unit of one pixel.
(2) An image is shifted in unit of specific block size (larger than one pixel).

With regard to positional relations of an image of estimation objective and a shifted image used for estimation, for example, there are ones as shown FIG. 24A through FIG. 24G. Shade hatched rectangles represent a position of a block in estimation objective image, while other rectangles represent a position of a shift destination block in image used for estimation. Of course, there may be other possible variations.

In the next place, another example of the estimation method of ECR (0, 0) is explained hereafter.

In addition to estimation methods explained heretofore, a method applicable for the case of carrying out a higher approximation is explained hereafter.

As an example of the estimation method, a method applicable for the case of carrying out a higher approximation is explained hereafter. A shift amount between an estimation objective image and a shifted image is expressed by two dimensional rectangular coordinates (x, y). (0, 0) corresponds to the case of no shift. A model where with respect to linear approximation and high level approximation, a correlation value of the shifted image is described by a linear equation and a higher order equation by x and y.

For example, when conducting n-th approximation, actually measured correlation value CR (x, y) in a shifted image that is shifted by (x, y) is supposed to be approximated by the following model:

$CR_{bar}(x, y) = \Sigma a_{ij} x^i y^j$ (where a range to take summation, i=0, . . . , n, j=0, . . . , n; provided i+j≦n) Wherein, it is assumed that $a_{ij}=a_{ji}$. In the n-th approximation, a plurality of shifted images of (x, y)≠(0, 0) are prepared, and coefficients $a_{ij}$ are determined from correlation values corresponding to those shifted images. The correlation value of the assumption objective image is estimated as the value of $a_{00}$.

There are various methods for estimation. First, a method of estimation using the least square method is explained. A square error ΔCR between the above actually measured correlation value and a model correlation value is defined as below.

$$\Delta CR = \sum_{x,y} (CR_{bar}(x, y) - CR(x, y))^2$$

Coefficients $a_{ij}$ are determined so that this ΔCR become minimum. For this, to all independent coefficients, a set of coefficients which satisfies the following may be obtained.

$$\partial \Delta CR / \Delta a_{ij} = 0$$

For easy and simple explanation, independent coefficients are expressed by "a" and "a'." Further, ΔCR is expressed as below.

$CR(x, y) = \Sigma_a a \cdot f_a(x, y)$

Wherein, when expressed by $$\partial \Delta CR / \partial a = 2 \sum_{x,y} \left( CR_{bar}(x, y) - \sum_{x,y} a' \cdot f_{a'}(x, y) \right) \cdot f_a(x, y) = 0$$

The above equation is expressed as below.

$$\sum_{a'} M_{aa'} \cdot a' = V_a$$

wherein $$M_{aa'} = \sum_{x,y} CR_{bar}(x, y) \cdot f_a(x, y) \cdot f_{a'}(x, y)$$

$$V_a = \sum_{x,y} f_a(x, y)$$

Determinant of matrix $M_{aa'}$ is non zero, the above simultaneous equations have a solution, and coefficient is given by the following.

$$a = \sum M_{aa'}^{-1} \cdot V_{a'}$$

Coefficient $a_{00}$ at this moment is the correlation value to be estimated. This method may be applicable for general degree models.

As described above, according to the present embodiment, it is possible, by estimating the correlation value of an original content on the basis of the correlation value of a shifted content, to detect a sequence of numbers embedded as a watermark into a content at lower costs and with higher precision.

While the description above refers to particular embodiment of the present invention, it will be understood that many modifications may be made without departing from the spirit thereof. The accompanying claims are intended to cover such modifications as would fall within the true scope and spirit of the present invention. The presently disclosed embodiment is therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the digital watermark embedding device of the present embodiment may be realized both as hardware and as software (program (for making a computer execute predetermined means, or for making a computer function as predetermined means, or making a computer realize predetermined functions). When the digital watermark embedding device as software is realized, its program may be delivered via storage media, and also its program may be delivered via communication media. Of course, this may be also applied to the digital watermark detecting device.

When the digital watermark embedding device or the digital watermark detecting device is realized as hardware, it may be formed as a semiconductor device.

When the digital watermark embedding device to which the present embodiment is applied is configured, or when a digital watermark embedding program is created, even when there are blocks or modules having an identical structure, it is possible to create all of them individually, while, it is also possible, by preparing one or an appropriate number of blocks or modules having an identical structure, to share such in respective portions in algorithm. This is similarly applied to the case of configuring a digital watermark detecting device or the case of creating the digital watermark detecting program. When configuring a system including the digital watermark embedding device and the digital watermark detecting device, or when preparing a system including the digital watermark embedding program and the digital watermark detecting program, it is also possible, by preparing one or an appropriate number of blocks or modules having an identical structure, over the digital watermark embedding device (or program) and the digital watermark detecting device (or program), to share (use repeatedly) such in respective portions in algorithm.

When the digital watermark embedding device or the digital watermark detecting device is configured by software, it is possible to conduct a high speed processing through parallel processing by use of a multi processor.

What is claimed is:

1. A digital watermark detecting device comprising:
   a sequence generator configured to generate a predetermined sequence of numbers corresponding to a watermark which is to be detected;
   a shift circuit configured to shift a detection objective content to obtain shifted content;
   a first correlation calculator configured to divide the detection objective content and the shifted content into blocks, and calculate a first correlation value of blocks of the shifted content with the predetermined sequence of numbers and a second correlation value of blocks of the detection objective content with the predetermined sequence of numbers;
   a second correlation calculator configured to calculate an estimated correlation value of blocks of an estimated original content in which no watermark is embedded with the predetermined sequence of numbers based on the first correlation value; and
   a determination unit configured to determine whether the predetermined sequence of numbers is embedded in the detection objective content based on the estimated correlation value and the second correlation value.

2. The digital watermark detecting device according to claim 1, wherein
   the detection objective content comprises image data,
   each of the blocks comprises at least one pixel, and
   the shift circuit comprises a unit configured to shift the image data in one of a horizontal direction and vertical direction by a predetermined number of blocks.

3. The digital watermark detecting device according to claim 1, wherein
   the detection objective content comprises image data,
   each of the blocks comprises plural pixels, and
   a block value of each of the blocks comprises one of an average value and a total value of pixel values of the plural pixels included in the block.

4. The digital watermark detecting device according to claim 1, wherein
   the detection objective content comprises image data,
   each of the blocks comprises one pixel, and
   a block value of each of the blocks comprises a pixel value of the pixel included in the block.

5. The digital watermark detecting device according to claim 1, wherein
   the predetermined sequence of numbers comprises a sequence of block values of the blocks arranged in accordance with a sequential order of the blocks.

6. The digital watermark detecting device according to claim 1, wherein
   when the determination unit determines that the predetermined sequence of numbers is not embedded in the detection objective content, the sequence generator generates another sequence of numbers corresponding to another watermark and the determination unit determines whether the another sequence of numbers is embedded in the detection objective content.

7. The digital watermark detecting device according to claim 1, wherein
   when the determination unit determines that the predetermined sequence of numbers is embedded in the detection objective content, the determination unit outputs the watermark corresponding to the predetermined sequence of numbers.

8. The digital watermark detecting device according to claim 1, wherein
   the predetermined sequence of numbers comprises one of a sequence of pseudo-random numbers, and a sequence obtained by multiplying each of the pseudo-random numbers by a transformation coefficient of frequency transformation.

9. The digital watermark detecting device according to claim 1, wherein
   the predetermined sequence of numbers corresponding to different watermarks are not correlated to each other.

10. A digital watermark detecting method comprising:
    generating a predetermined sequence of numbers corresponding to a watermark which is to be detected;
    shifting a detection objective content to obtain shifted content;
    dividing the detection objective content and the shifted content into blocks;
    calculating a first correlation value of blocks of the shifted content with the predetermined sequence of numbers and a second correlation value of blocks of the detection objective content with the predetermined sequence of numbers;

calculating an estimated correlation value of blocks of an estimated original content in which no watermark is embedded with the predetermined sequence of numbers based on the first correlation value; and determining whether the predetermined sequence of numbers is embedded in the detection objective content based on the estimated correlation value and the second correlation value.

11. The digital watermark detecting method according to claim 10, wherein the detection objective content comprises image data, each of the blocks comprises at least one pixel, and the shifting comprises shifting the image data in one of a horizontal direction and vertical direction by a predetermined number of blocks.

12. The digital watermark detecting method according to claim 10, wherein the detection objective content comprises image data, each of the blocks comprises plural pixels, and a block value of each of the blocks comprises one of an average value and a total value of pixel values of the plural pixels included in the block.

13. The digital watermark detecting method according to claim 10, wherein the detection objective content comprises image data, each of the blocks comprises one pixel, and a block value of each of the blocks comprises a pixel value of the pixel included in the block.

14. The digital watermark detecting method according to claim 10, wherein the predetermined sequence of numbers comprises a sequence of block values of the blocks arranged in accordance with a sequential order of the blocks.

15. The digital watermark detecting method according to claim 10, wherein when the determining determines that the predetermined sequence of numbers is not embedded in the detection objective content, the generating generates another sequence of numbers corresponding to another watermark and the determining determines whether the another sequence of numbers is embedded in the detection objective content.

16. The digital watermark detecting method according to claim 10, wherein when the determining determines that the predetermined sequence of numbers is embedded in the detection objective content, the watermark corresponding to the predetermined sequence of numbers is output.

17. The digital watermark detecting method according to claim 10, wherein the predetermined sequence of numbers comprises one of a sequence of pseudo-random numbers, and a sequence obtained by multiplying each of the pseudo-random numbers by a transformation coefficient of frequency transformation.

18. The digital watermark detecting method according to claim 10, wherein the predetermined sequence of numbers corresponding to different watermarks are not correlated to each other.

19. An article of manufacture comprising a computer usable medium having computer readable program code means embodied therein, the computer readable program code means comprising:

computer readable program code means for causing a computer to generate a predetermined sequence of numbers corresponding to a watermark which is to be detected;

computer readable program code means for causing a computer to shift a detection objective content to obtain shifted content;

computer readable program code means for causing a computer to divide the detection objective content and the shifted content into blocks;

computer readable program code means for causing a computer to calculate a first correlation value of blocks of the shifted content with the predetermined sequence of numbers and a second correlation value of blocks of the detection objective content with the predetermined sequence of numbers;

computer readable program code means for causing a computer to calculate an estimated correlation value of blocks of an estimated original content in which no watermark is embedded with the predetermined sequence of numbers based on the first correlation value; and computer readable program code means for causing a computer to determine whether the predetermined sequence of numbers is embedded in the detection objective content based on the estimated correlation value and the second correlation value.

* * * * *